(12) United States Patent
Watanabe et al.

(10) Patent No.: US 10,982,638 B2
(45) Date of Patent: Apr. 20, 2021

(54) DEVICE FOR CONTROLLING HIGH-PRESSURE FUEL SUPPLY PUMP, AND HIGH-PRESSURE FUEL SUPPLY PUMP

(71) Applicant: HITACHI AUTOMOTIVE SYSTEMS, LTD., Hitachinaka (JP)

(72) Inventors: Masanori Watanabe, Tokyo (JP);
Shunsuke Aritomi, Tokyo (JP);
Masayuki Suganami, Ibaraki (JP); Ryo Kusakabe, Ibaraki (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 261 days.

(21) Appl. No.: 16/305,366

(22) PCT Filed: Mar. 15, 2017

(86) PCT No.: PCT/JP2017/010292
§ 371 (c)(1),
(2) Date: Nov. 28, 2018

(87) PCT Pub. No.: WO2017/208565
PCT Pub. Date: Jul. 12, 2017

(65) Prior Publication Data
US 2020/0318592 A1    Oct. 8, 2020

(30) Foreign Application Priority Data
May 31, 2016    (JP) .............................. JP2016-108093

(51) Int. Cl.
*F02D 41/38*    (2006.01)
*F02M 59/36*    (2006.01)
(Continued)

(52) U.S. Cl.
CPC ....... *F02M 59/366* (2013.01); *F02D 41/3845* (2013.01); *F02D 2041/2055* (2013.01);
(Continued)

(58) Field of Classification Search
CPC .. F02M 59/366; F02M 59/466; F02M 65/005; F02M 2200/09; F02D 41/3845; F02D 2041/2055; F02D 2250/31
(Continued)

(56) References Cited

U.S. PATENT DOCUMENTS 7,905,215 B2    3/2011  Suzuki et al.
10,655,614 B2 *  5/2020  Takagawa ............. F04B 7/0076
(Continued)

FOREIGN PATENT DOCUMENTS

DE    11 2014 003 561 T5    4/2016
EP        2 955 365 A1    12/2015
(Continued)

OTHER PUBLICATIONS

International Search Report and Written Opinion received in International Application No. PCT/JP2017/010292 dated Jun. 20, 2017.
(Continued)

*Primary Examiner* — Hai H Huynh
(74) *Attorney, Agent, or Firm* — Foley & Lardner LLP

(57) ABSTRACT

To reduce collision noise caused when an electromagnetic valve of a high-pressure fuel supply pump is opened. Therefore, in a control device for controlling a high-pressure fuel supply pump including: an anchor; a fixed core configured to attract the anchor with an electromagnetic force; a suction valve configured to be opened or closed when the anchor is sucked by the fixed core; and an electromagnetic force generation unit configured to generate the electromagnetic force when applied with a driving voltage, it can be achieved by providing a control unit configured to perform control to lower a driving current from a peak current before a timing at which the anchor is sucked by the fixed core and collides
(Continued)

in an operation state where an engine is under no load and an engine rotation speed is equal to or less than a set rotation speed.

4 Claims, 11 Drawing Sheets

(51) Int. Cl.
  *F02D 41/20* (2006.01)
  *F02M 59/46* (2006.01)
  *F02M 65/00* (2006.01)

(52) U.S. Cl.
  CPC ....... *F02D 2250/31* (2013.01); *F02M 59/466* (2013.01); *F02M 65/005* (2013.01); *F02M 2200/09* (2013.01)

(58) Field of Classification Search
  USPC ....... 123/457, 458, 495, 497, 498, 499, 510, 123/511
  See application file for complete search history.

(56) References Cited

U.S. PATENT DOCUMENTS

| | | |
|---|---|---|
| 2009/0301439 A1 | 12/2009 | Suzuki et al. |
| 2010/0237266 A1 | 9/2010 | Haaf et al. |
| 2012/0000445 A1 | 1/2012 | Borg et al. |
| 2013/0226488 A1 | 8/2013 | Wirkowski et al. |
| 2016/0186741 A1 | 6/2016 | Sakamoto et al. |
| 2017/0082099 A1 | 3/2017 | Takagawa et al. |

FOREIGN PATENT DOCUMENTS

| | | |
|---|---|---|
| JP | 2001-182593 A | 7/2001 |
| JP | 2010-014109 A | 1/2010 |
| JP | 2010 533820 A | 10/2010 |
| JP | 2012-036886 A | 2/2012 |
| JP | 7013-536365 A | 9/2013 |
| JP | 2015-014221 A | 1/2015 |
| WO | WO 2015/174037 A1 | 11/2015 |

OTHER PUBLICATIONS

Extended European Search Report issued in corresponding European Patent Application No. 17806127.1 dated Nov. 20, 2019.

* cited by examiner

DEVICE FOR CONTROLLING HIGH-PRESSURE FUEL SUPPLY PUMP, AND HIGH-PRESSURE FUEL SUPPLY PUMP

TECHNICAL FIELD

The present invention relates to a control device for a high-pressure fuel supply pump to be used in an internal combustion engine, and to a high-pressure fuel supply pump.

BACKGROUND ART

In recent years, from the viewpoint of improving comfort, a need for quietness for high-pressure fuel supply pumps is increasing. Various inventions have been made in terms of reducing noise of the high-pressure fuel supply pumps. Methods of reducing noise is broadly classified into one based on a structural change and the like, and the other based on control. Regarding the latter control, the following invention is disclosed as a technique concerning reduction of noise of a collision sound caused at a time of opening and closing a valve, by controlling a current to an electromagnetic valve.

CITATION LIST

Patent Literature

PTL 1: JP 2012-36886 A
PTL 2: WO 2015/174037 A1

SUMMARY OF INVENTION

Technical Problem

In JP 2012-36886 A (PTL 1), collision noise is reduced by lowering an energizing current value to an electromagnetic valve before an electromagnetic suction valve is opened. Further, in WO 2015/174037 A1 (PTL 2), valve closing is detected based on a change in a current value to an electromagnetic suction valve.

However, since a current reduction method disclosed in PTL 1 cannot accurately detect a timing at which the electromagnetic valve is opened, a desired reduction effect may not be obtained if the valve opening timing differs due to individual variations or the like of a pump. Further, in a detection method disclosed in PTL 2, while a relatively clear current waveform with no noise is targeted, it is considered that detection is difficult with the disclosed detection method when ON and OFF of a voltage is repeated since a current value fluctuates.

The present invention has been made in view of these circumstances, and a main object of the present invention is to reduce collision sound caused when an electromagnetic valve is opened.

Solution to Problem

The present invention for achieving the above object can be realized, as an example, in a control device for controlling a high-pressure fuel supply pump including: an anchor; a fixed core configured to suck the anchor with an electromagnetic force; a suction valve configured to be opened or closed when the anchor is sucked by the fixed core; and an electromagnetic force generation unit configured to generate the electromagnetic force when applied with a driving voltage, by providing a control unit configured to perform control to lower a driving current from a peak current before a timing at which the anchor is sucked by the fixed core and collides in an operation state where an engine is under no load and an engine rotation speed is equal to or less than a set rotation speed.

Advantageous Effects of Invention

According to the present invention, it is possible to provide a control devise and a high-pressure fuel supply pump for reducing collision sound when an electromagnetic valve is opened. The problems, configurations, and effects other than those described above will be clarified by the description of the embodiments below.

DESCRIPTION OF EMBODIMENTS

Hereinafter, embodiments of the present invention will be described.

First Embodiment

Figure 2:
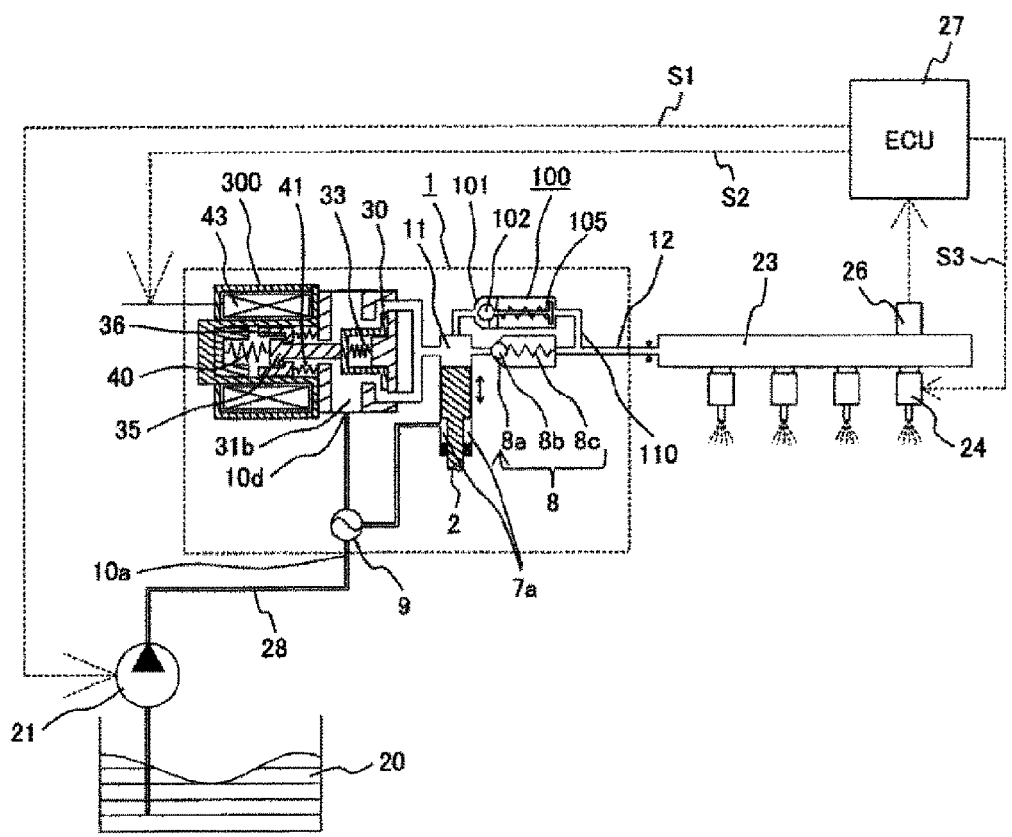
FIG. 2 is an overall configuration of the high-pressure fuel supply pump of the first embodiment according to the present invention.

FIG. 2 is a view showing an example of an overall configuration of a fuel supply system including a high-pressure fuel supply pump to which the present invention can be applied. First, a configuration and an operation of the entire system will be described using this figure. In FIG. 2, a portion 1 surrounded by a broken line indicates a high-pressure fuel supply pump body, showing that mechanisms and components indicated in this broken line are integrally incorporated in a high-pressure fuel supply pump body 1. Into the high-pressure fuel supply pump body 1, fuel is fed from a fuel tank 20 via a feed pump 21, and pressurized fuel is fed from the high-pressure fuel supply pump body 1 toward an injector 24. An engine control unit (ECU) 27 takes in a pressure of the fuel from a pressure sensor 26, and controls the feed pump 21, an electromagnetic coil 43 in the high-pressure fuel supply pump body 1, and the injector 24 so as to optimize the pressure.

In FIG. 2, fuel in the fuel tank 20 is firstly pumped up by the feed pump 21 based on a control signal S1 from the engine control unit 27, pressurized to an appropriate feed pressure, and sent to a low-pressure fuel inlet (suction joint) 10a of the high-pressure fuel supply pump 1 through a suction pipe 28. The fuel having passed through the low-pressure fuel inlet 10a reaches a suction port 31b of an electromagnetic suction valve 300 that forms a capacity variable mechanism via a pressure pulsation reduction mechanism 9 and a suction passage 10d. Meanwhile, the pressure pulsation reduction mechanism 9 communicates with an annular low-pressure fuel chamber 7a that makes pressure variable in conjunction with a plunger 2 that is reciprocatingly moved by a cam mechanism (not shown) of an engine, thereby to reduce the pressure pulsation of the fuel sucked by the suction port 31b of the electromagnetic suction valve 300.

The fuel flowing into the suction port 31b of the electromagnetic suction valve 300 passes through a suction valve 30 and flows into a pressuring chamber 11. Meanwhile, a valve position of the suction valve 30 is determined by controlling the electromagnetic coil 43 in the high-pressure fuel supply pump body 1 based on a control signal S2 from the engine control unit 27. In the pressuring chamber 11, a force to cause the plunger 2 to make a reciprocating motion is applied by the cam mechanism (not shown) of the engine. Through the reciprocating motion of the plunger 2, the fuel is sucked from the suction valve 30 in a falling process of the plunger 2, while the sucked fuel is pressurized and pumped to a common rail 23 equipped with the pressure sensor 26 through a discharge valve mechanism 8 in a rising process of the plunger 2. Thereafter, based on a control signal S3 from the engine control unit 27, the injector 24 injects the fuel to the engine.

Meanwhile, the discharge valve mechanism 8 provided at an output port of the pressuring chamber 11 is configured by a discharge valve seat 8a, a discharge valve 8b that comes into contact with and separates from the discharge valve seat 8a, a discharge valve spring 8c that biases the discharge valve 8b toward the discharge valve seat 8a, and the like. According to this discharge valve mechanism 8, when an internal pressure of the pressuring chamber 11 is higher than a pressure in a discharge passage 12 on the downstream side of the discharge valve 8b, and the discharge valve spring 8c overcomes a predetermined resistance, the discharge valve 8b is opened, and the pressurized fuel is pumped and supplied from the pressuring chamber 11 toward the discharge passage 12.

In addition, regarding individual components of the electromagnetic suction valve 300 of FIG. 2, the reference numeral 30 indicates the suction valve; 35 indicates a rod configured to control a position of the suction valve 30; indicates the anchor; 33 indicates a suction valve spring; 40 indicates a rod biasing spring; and 41 indicates an anchor biasing spring. According to this mechanism, the suction valve 30 is biased in a valve closing direction by the suction valve spring 33, and is biased in a valve opening direction via the rod 35 by the rod biasing spring 40. Further, the anchor 36 is biased in the valve closing direction by the anchor biasing spring. A valve position of the suction valve 30 is controlled by driving the rod 35 with the electromagnetic coil 43.

In this way, the high-pressure fuel supply pump 1 discharges fuel of a flow rate that enables the fuel pumped to the common rail 23 via the discharge valve mechanism 8 to become desired supply fuel, by controlling the electromagnetic coil 43 in the high-pressure fuel supply pump body 1 with the control signal S2 given to the electromagnetic suction valve 300 by the engine control unit 27.

Further, in the high-pressure fuel supply pump 1, the pressuring chamber 11 and the common rail 23 are connected with each other by a relief valve 100. This relief valve 100 is a valve mechanism arranged in parallel with the discharge valve mechanism 8. In the relief valve 100, when a pressure on the common rail 23 side rises to be equal to or higher than a set pressure of the relief valve 100, the relief valve 100 is opened and fuel is returned into the pressuring chamber 11 of the high-pressure fuel supply pump 1, to prevent an abnormal high pressure state in the common rail 23.

The relief valve 100 forms a high-pressure passage 110 that communicates between the discharge passage 12 on the downstream side of the discharge valve 8b and the pressuring chamber 11 in the high-pressure fuel supply pump body 1, and is provided to bypass the discharge valve 8b there. The high-pressure passage 110 is provided with a relief valve 102 that limits a flow of fuel in only one direction from a discharge passage to the pressuring chamber 11. The relief valve 102 is pressed against a relief valve seat 101 by a relief spring 105 that generates a pressing force, and the relief valve 102 is configured to separate from the relief valve seat 101 and is opened when a pressure difference between an inside of the pressuring chamber 11 and an inside of the high-pressure passage 110 becomes equal to or higher than a specified pressure determined by the relief spring 105.

As a result, in a case where a pressure of the common rail 23 becomes abnormally high due to failure or the like of the electromagnetic suction valve 300 of the high-pressure fuel supply pump 1, when a differential pressure between the discharge passage 110 and the pressuring chamber 11 becomes equal to or higher than the valve opening pressure of the relief valve 102, the relief valve 102 is opened and the fuel having an abnormal high pressure is returned from the discharge passage 110 to the pressuring chamber 11, so that a highly pressured pipe such as the common rail 23 is protected.

Figure 1:
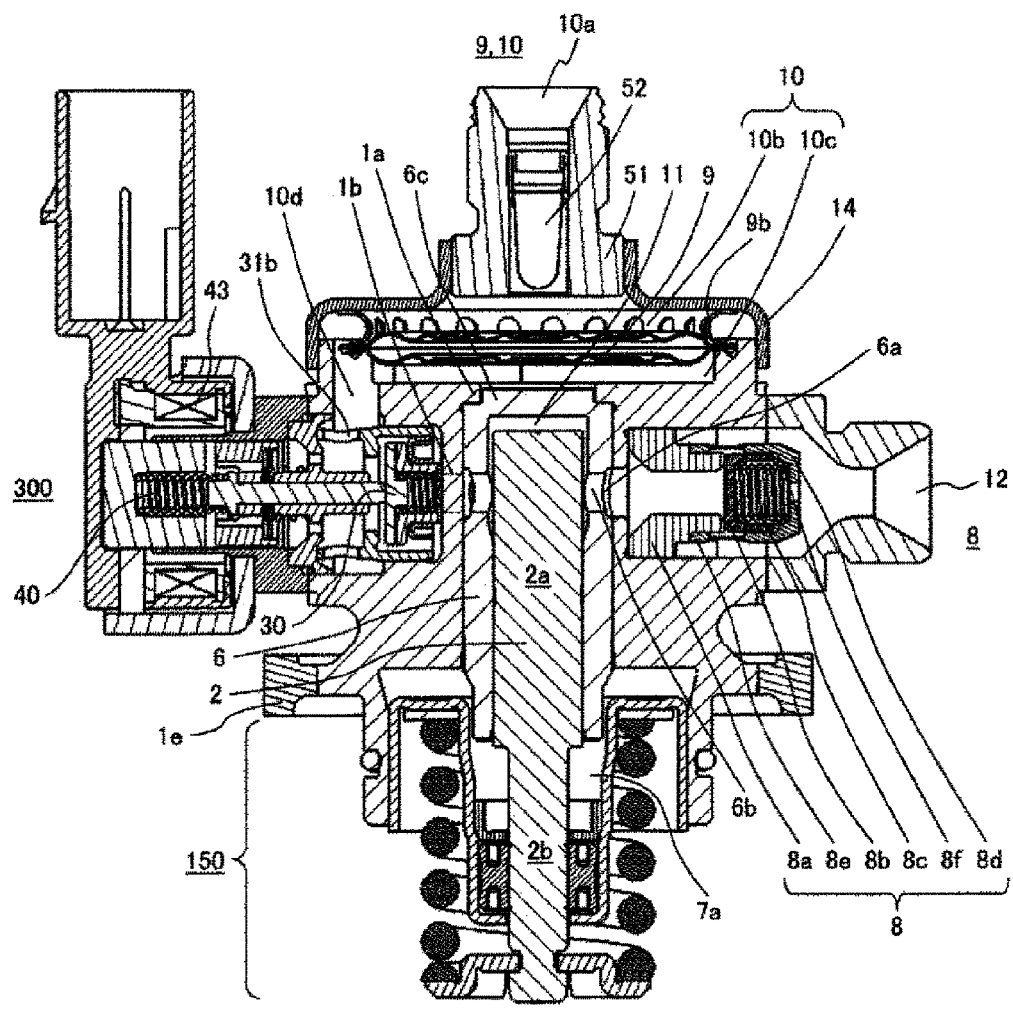
FIG. 1 is an overall longitudinal cross-sectional view of a high-pressure fuel supply pump of a first embodiment according to the present invention.

FIG. 1 is a view showing the high-pressure fuel supply pump body 1 structured integrally as a mechanism. According to this figure, the plunger 2 that is reciprocatingly moved by (in this case, a vertical movement) by the cam mechanism (not shown) of the engine is disposed in a cylinder 6 in a height direction in a center of the figure, and the pressuring chamber 11 is formed in the cylinder 6 above the plunger.

Figure 3:
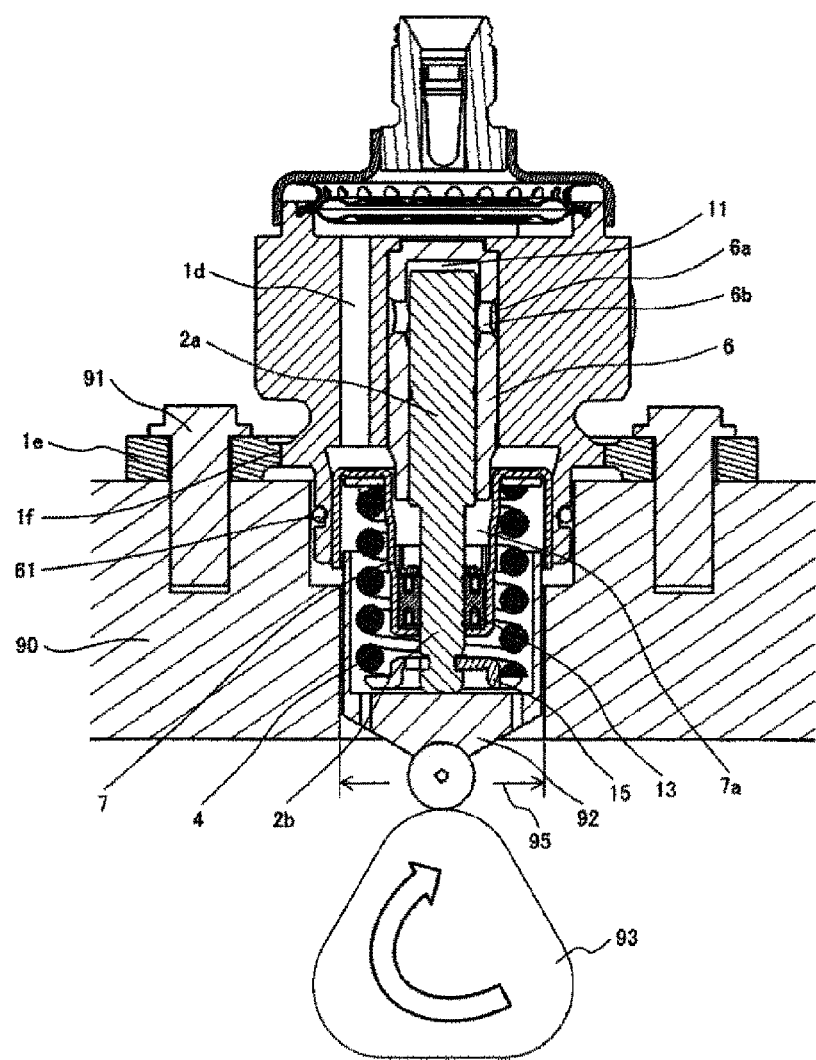
FIG. 3 is a cross-sectional view of the high-pressure fuel supply pump of the first embodiment according to the present invention when the high-pressure fuel supply pump is attached.

Further, according to this figure, a mechanism on the electromagnetic suction valve 300 side is disposed on the left side from the center of the figure, while the discharge valve mechanism 8 is disposed on the right side from the center of the figure. Further, in an upper part of the figure, there are disposed the low-pressure fuel inlet 10a, the pressure pulsation reduction mechanism 9, the suction passage 10d, and the like, as a mechanism on the fuel suction side. Furthermore, a mechanism 150 of the plunger on the internal combustion engine side is described in a lower part in the center of FIG. 1. Since the mechanism 150 of the plunger on the internal combustion engine side is a part that is embedded and fixed in the internal combustion engine main body as shown in FIG. 3, the mechanism 150 is referred to as attachment root portion here. It should be noted that a mechanism of the relief valve 100 is not illustrated in the cross-sectional view of FIG. 1. Although the mechanism of the relief valve 100 can be illustrated in the cross-sectional view from another angle, explanation and illustration are omitted since the mechanism is not directly related to the present invention.

While detailed description of each part in FIG. 2 will be described later, attachment of the attachment root portion is described first with reference to FIG. 3. FIG. shows a state in which the attachment root portion (mechanism of the plunger on the internal combustion engine side) 150 is embedded in the internal combustion engine main body and fixed. However, description of other parts is omitted since the attachment root portion 150 is mainly described in FIG. 3. In FIG. 3, reference numeral 90 indicates a thick portion of a cylinder head of the internal combustion engine. In the cylinder head 90 of the internal combustion engine, an attachment root portion attaching hole 95 is formed in advance. The attachment root portion attaching hole 95 is configured to have a two-stage diameter in accordance with a shape of the attachment root portion 150, and the attachment root portion 150 is disposed and fitted into the root portion attaching hole 95.

Then, the attachment root portion 150 is air-tightly fixed to the cylinder head 90 of the internal combustion engine. In an example of the air-tightly fixing arrangement of FIG. 3, the high-pressure fuel supply pump closely contacts a flat surface of the cylinder head 90 of the internal combustion engine with use of a flange 1e provided on the pump body 1, and is fixed by a plurality of bolts 91. Then, the attaching flange 1e is bonded by welding the entire periphery to the pump body 1 with a welding portion 1f to form a circular fixing portion. In the present embodiment, laser welding is used for welding the welding portion 1f. In addition, an O-ring 61 is fitted to the pump body 1 for sealing between the cylinder head 90 and the pump body 1, to prevent engine oil from leaking to the outside.

The plunger root portion 150 thus air-tightly disposed and fixed is provided with a tappet 92 configured to convert a rotational motion of a cam 93 attached to a cam shaft of the internal combustion engine into a vertical motion and transfer the vertical motion to the plunger 2 at a lower end 2b of the plunger 2. The plunger 2 is pressed to the tappet 92 by a spring 4 via a retainer 15. This causes the plunger 2 to make a reciprocating motion in a vertical direction in accordance with the rotational motion of the cam 93.

Further, a plunger seal 13 held at a lower end portion of an inner periphery of a seal holder 7 is provided to slidably contact with an outer periphery of the plunger 2 in the lower part of the cylinder 6 in the figure, and the plunger seal 13 has a structure that can seal the fuel in the annular low-pressure fuel chamber 7a even when the plunger 2 slides, to prevent leakage of fuel to the outside. At the same time, lubricating oil (including engine oil) that lubricates sliding parts in the internal combustion engine is prevented from flowing into the pump body 1.

As shown in FIG. 3, in the plunger root portion 150 that is disposed and fixed air-tightly, the plunger 2 inside thereof makes a reciprocating motion in the cylinder 6 as the internal combustion engine rotates. An operation of each part along with this reciprocating motion will be described with reference back to FIG. 1. In FIG. 1, the high-pressure fuel supply pump body 1 is attached with the cylinder 6 having an end portion (upper side in FIG. 1) formed in a bottomed tubular shape so as to guide the reciprocating motion of the plunger 2 and form the pressuring chamber 11 inside thereof. Further, the pressuring chamber 11 is provided with an annular groove 6a on an outer peripheral side and a plurality of communication holes 6b communicating the annular groove 6a and the pressuring chamber, so as to communicate with the electromagnetic suction valve 300 that is for supplying of fuel and the discharge valve mechanism 8 that is for discharging of fuel from the pressuring chamber 11 to the discharge passage.

The cylinder 6 is press-fitted and fixed to the high-pressure fuel supply pump body 1 at its outer diameter, and is sealed with a press-fit portion cylindrical surface such that the pressurized fuel does not leak to the low pressure side through a gap between with the high-pressure fuel supply pump body 1. Further, the cylinder 6 has a small diameter portion 6c on an outer diameter on the pressuring chamber side. As the fuel in the pressuring chamber 11 is pressurized, a force acts on the cylinder 6 toward a low-pressure fuel chamber 10c. However, providing a small diameter portion 1a in the pump body 1 prevents the cylinder 6 from coming off to the low-pressure fuel chamber 10c side. In addition to the sealing of the contact cylindrical surface between the high-pressure fuel supply pump body 1 and the cylinder 6, bringing the surfaces in planar contact with each other in an axial direction can provide a double sealing function.

On a head of the high-pressure fuel supply pump body 1, a damper cover 14 is fixed. In the damper cover 14, a suction joint 51 is provided and forms the low-pressure fuel inlet 10a. The fuel having passed through the low-pressure fuel inlet 10a passes through a filter 52 fixed inside the suction joint 51, and reaches the suction port 31b of the electromagnetic suction valve 300 via the pressure pulsation reduction mechanism 9 and a low-pressure fuel passage 10d.

The suction filter 52 in the suction joint 51 serves to prevent foreign matter present between the fuel tank 20 and the low-pressure fuel inlet 10a from being absorbed into the high-pressure fuel supply pump by the flow of fuel.

Since the plunger 2 has a large diameter portion 2a and a small diameter portion 2b, a volume of the annular low-pressure fuel chamber 7a is increased or decreased by the reciprocating motion of the plunger. With the communication with a low-pressure fuel chamber 10 through a fuel passage 1d (FIG. 3), the increased or decreased volume causes a flow of the fuel from the annular low-pressure fuel chamber 7a toward the low-pressure fuel chamber 10 when the plunger 2 goes down, and from the low-pressure fuel chamber 10 toward the annular low-pressure fuel chamber 7a when the plunger goes up. This enables reduction of a flow rate of the fuel to the inside and outside of the pump during a suction process or a return process of the pump, and provides a function of reducing pulsation.

The low-pressure fuel chamber 10 is provided with the pressure pulsation reduction mechanism 9 that reduces spreading of a pressure pulsation caused in the high-pressure fuel supply pump to a fuel pipe 28 (FIG. 2). When the fuel once flowing into the pressuring chamber 11 is returned to the suction passage 10d (suction port 31b) through the suction valve 30 that is in a valve opened state for capacity control, the fuel returned to the suction passage 10d (suction port 31b) causes a pressure pulsation in the low-pressure fuel chamber 10. However, the pressure pulsation reduction mechanism 9 provided in the low-pressure fuel chamber 10 is formed by a metal damper in which two corrugated disk-shaped metal plates are laminated on an outer periphery thereof and an inert gas such as argon is injected into the inside, and expansion and contraction of this metal damper absorbs and reduces the pressure pulsation. The reference numeral 9b indicates an attachment metal fitting to fix the metal damper to the inner peripheral portion of the high-pressure fuel supply pump body 1, and the attachment metal fitting is installed on a fuel passage. Therefore, a plurality of holes are provided such that fluid can freely move to and from front and back surfaces of the mounting bracket 9b.

The discharge valve mechanism 8 provided at the output port of the pressuring chamber 11 is configured by the discharge valve seat 8a, the discharge valve 8b that comes into contact with and separates from the discharge valve seat 8a, the discharge valve spring 8c to bias the discharge valve 8b toward the discharge valve seat 8a, and a discharge valve holder 8d that accommodates the discharge valve 8b and the discharge valve seat 8a. The discharge valve seat 8a and the discharge valve holder 8d are joined by welding at an abutting portion 8e, to form the integral discharge valve mechanism 8. Moreover, inside the discharge valve holder 8d, there is provided a stepped portion 8f forming a stopper to regulate a stroke of the discharge valve 8b.

In FIG. 1, in a state where there is no fuel pressure difference between the pressuring chamber 11 and a fuel discharge port 12, the discharge valve 8b is pressed against the discharge valve seat 8a by a biasing force of the discharge valve spring 8c, and is in a valve closed state. When the fuel pressure in the pressuring chamber 11 becomes higher than the fuel pressure at the fuel discharge port 12, the discharge valve 8b starts to be opened against the discharge valve spring 8c, and the fuel in the pressuring chamber 11 is discharged at a high pressure to the common rail 23 via the fuel discharge port 12. The discharge valve 8b contacts the discharge valve stopper 8f when being opened, to limit the stroke. Therefore, the stroke of the discharge valve 8b is appropriately determined by the discharge valve stopper 8f. This can prevent the fuel discharged at a high pressure to the fuel discharge port 12 from flowing back into the pressuring chamber 11 again due to a closing delay caused by an excessive stroke of the discharge valve 8b, enabling suppression of reduction in efficiency of the high-pressure fuel supply pump. In addition, the discharge valve 8b is guided by an inner peripheral surface of the discharge valve holder 8d so as to move only in the stroke direction when the discharge valve 8b is repeatedly opened and closed. With the above configuration, the discharge valve mechanism 8 becomes a check valve that limits the flowing direction of the fuel.

Figure 4:
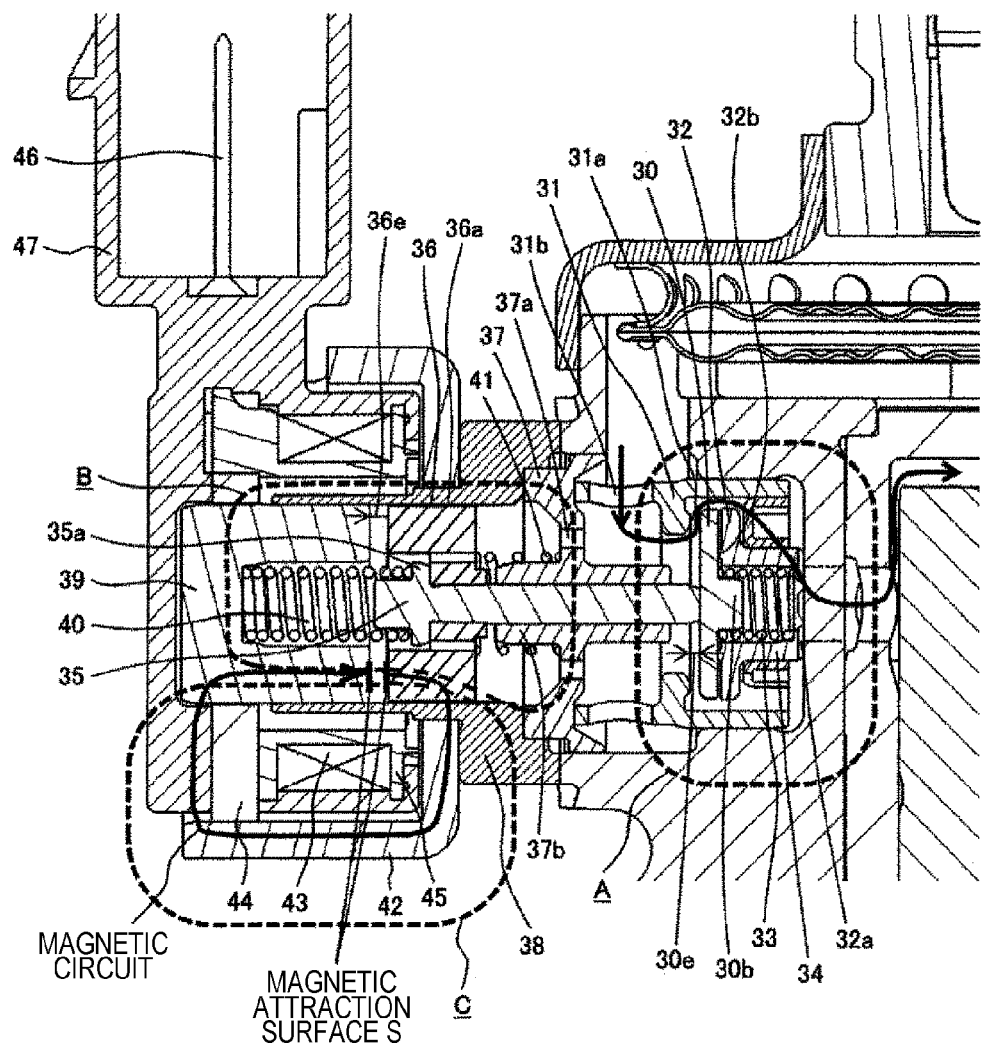
FIG. 4 is a cross-sectional view of an electromagnetic valve of the high-pressure fuel supply pump of the first embodiment according to the present invention in a suction process.
Figure 5:
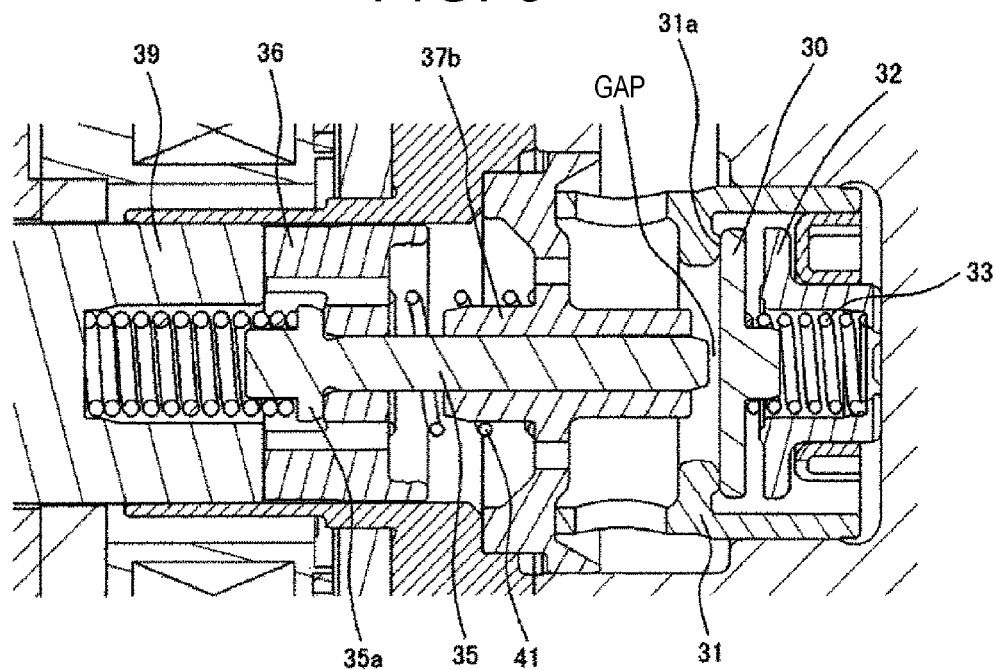
FIG. 5 is a cross-sectional view of the electromagnetic valve of the high-pressure fuel supply pump of the first embodiment according to the present invention in a discharge process and during energization.
Figure 6:
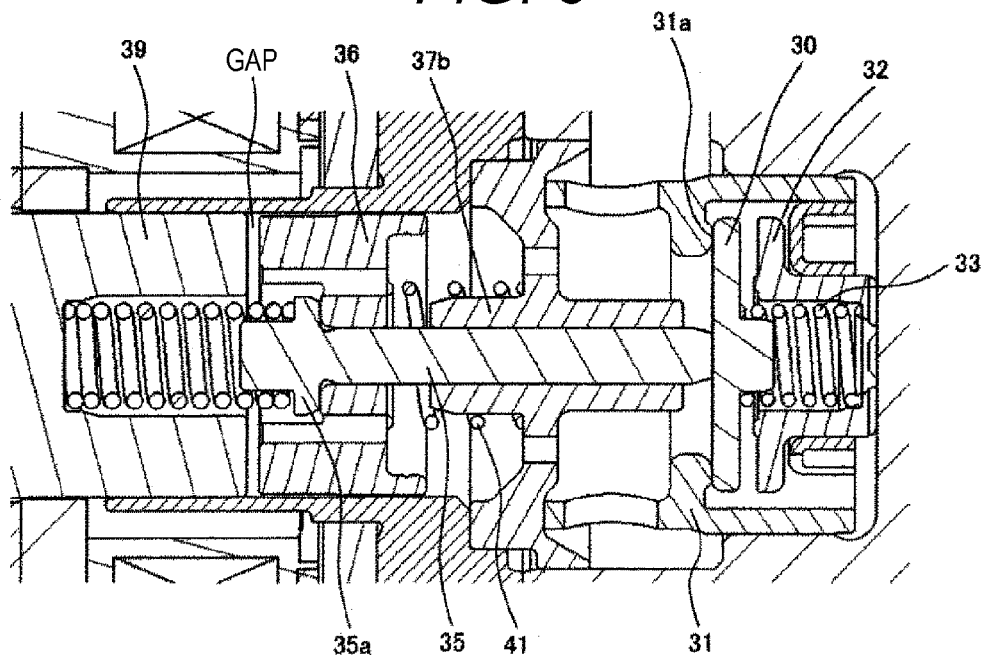
FIG. 6 is a cross-sectional view of the electromagnetic valve of the high-pressure fuel supply pump of the first embodiment according to the present invention in the discharge process and during non-energization.

Next, a structure of the electromagnetic suction valve 300, which is a main part of the present invention, will be described with reference to FIGS. 4, 5, and 6. Note that FIG. 4 shows a state in the suction process of each of the suction, return, and discharge processes in a pump operation, and FIGS. 5 and 6 show a state in the discharge process. First, a structure of the electromagnetic suction valve 300 side will be described with reference to FIG. 4. The structure on the electromagnetic suction valve 300 side is described by roughly dividing into a suction valve portion A mainly configured by the suction valve 30; a solenoid mechanism portion B mainly configured by the rod 35 and the anchor 36; and a coil portion C mainly configured by the electromagnetic coil 43. First, the suction valve portion A consists of the suction valve 30, a suction valve seat 31, a suction valve stopper 32, a suction valve biasing spring 33, and a suction valve holder 34. Among them, the suction valve seat 31 is cylindrical, and has a seat portion 31a on an inner peripheral side in an axial direction, and two or more suction port portions 31b for one each radially around an axis of the cylinder. The suction valve seat 31 is press-fitted and retained in the high-pressure fuel supply pump body 1 at an outer peripheral cylindrical surface.

The suction valve holder 34 has claws radially in two or more directions, and an outer peripheral side of the claw is coaxially fitted and held on an inner peripheral side of the suction valve seat 31. Further, the suction valve stopper 32 having a cylindrical shape and having a brim shape at one end is press-fitted and retained on the inner peripheral cylindrical surface of the suction valve holder 34.

The suction valve biasing spring 33 is disposed on an inner peripheral side of the suction valve stopper 32, in a small diameter portion to coaxially stabilize one end of the spring partially. The suction valve 30 is configured such that the suction valve biasing spring 33 is fitted into a valve guide portion 30b between the suction valve seat portion 31a and the suction valve stopper 32. The suction valve biasing spring 33 is a compression coil spring and is mounted such that a biasing force acts in a direction in which the suction valve 30 is pressed against the suction valve seat portion 31a. The suction valve biasing spring 33 is not limited to a compression coil spring, but may be in any form as long as it can provide a biasing force, and may be a leaf spring and the like having a biasing force integrated with the suction valve.

By configuring the suction valve portion A in this way, in the suction process of the pump, the fuel having passed through a suction port 31b and entered inside passes between the suction valve 30 and the seat portion 31a, passes an outer peripheral side of the suction valve 30 and between the claws of the suction valve holder 34, and passes through the high-pressure fuel supply pump body 1 and the passage of the cylinder. This causes the fuel to flow into the pump chamber. In addition, in the discharge process of the pump, the suction valve 30 contacts and seals the suction valve seat portion 31a, thereby fulfilling the function of a check valve preventing backflow of the fuel to an inlet side.

Moreover, in order to smooth the movement of the suction valve 30, a passage 32a is provided in order to release a fluid pressure on the inner peripheral side of the suction valve stopper in accordance with the movement of the suction valve 30.

An axial moving amount 30e of the suction valve 30 is finitely restricted by the suction valve stopper 32. This is because, if the moving amount becomes too large, the backflow amount increases due to a response delay at a time of closing the suction valve 30, and the performance of the pump deteriorates. This restriction of the moving amount can be defined by a shape and a dimension in an axial direction, and a press-fitted position of the suction valve seat 31a, the suction valve 30, and the suction valve stopper 32.

The suction valve stopper 32 is provided with an annular protrusion 32b, to reduce a contact area between with the suction valve stopper 32 in a state where the suction valve 30 is opened. This is to cause the suction valve 30 to be easily separated from the suction valve stopper 32, that is, to improve the valve closing responsiveness at a transition from the valve opened state to the valve closed state. In the absence of the annular protrusion, that is, when the contact area is large, a large squeezing force acts between the suction valve 30 and the suction valve stopper 32, making it difficult for the suction valve 30 to separate from the suction valve stopper 32.

Since the suction valve 30, the suction valve seat 31a, and the suction valve stopper 32 repeatedly collide with each other during operation, there is used a material obtained by applying heat treatment to a martensitic stainless steel that has high strength, high hardness, and excellent corrosion resistance. For the suction valve spring 33 and the suction valve holder 34, an austenitic stainless steel material is used in consideration of corrosion resistance.

Next, the solenoid mechanism portion B will be described. The solenoid mechanism portion B consists of the rod 35 and the anchor 36 as movable portions, a rod guide 37, an outer core 38, and a fixed core 39 as fixed portions, and the rod biasing spring 40 and the anchor biasing spring 41.

The rod 35 and the anchor 36, which are movable portions, are formed as separate members. The rod 35 is held slidably in an axial direction on an inner peripheral side of the rod guide 37, while an inner peripheral side of the anchor 36 is held slidably on an outer peripheral side of the rod 35. That is, both the rod 35 and the anchor 36 are configured to be axially slidable within a range geometrically restricted.

Since the anchor 36 moves freely and smoothly in an axial direction in the fuel, the anchor 36 has one or more through holes 36a penetrating in the axial direction of the component, to eliminate limitation of a movement due to a pressure difference between the front and rear of the anchor 36 as much as possible.

The rod guide 37 is configured to be inserted into an inner peripheral side of the hole inserted with the suction valve of the high-pressure fuel supply pump body 1 in a radial direction, abut against one end of the suction valve seat in an axial direction, and is arranged to be sandwiched between the outer core 38 welded and fixed to the high-pressure fuel supply pump body 1 and the high-pressure fuel supply pump body 1. Similarly to the anchor 36, the rod guide 37 is provided with a through hole 37a penetrating in the axial direction, and configured such that the pressure of the fuel chamber on the anchor 36 side does not disturb the movement of the anchor 36 so that the anchor 36 can freely and smoothly move.

The outer core 38 has a thin-walled cylindrical shape on a side opposite to the portion to be welded to the high-pressure fuel supply pump body, and is welded and fixed in such a manner that the fixed core 39 is inserted into an inner peripheral side of the outer core 38. The rod biasing spring 40 is disposed on an inner peripheral side of the fixed core 39 with a small diameter portion as a guide, and applies a biasing force in a direction in which the rod 35 comes into contact with the suction valve 30 and the suction valve separates from the suction valve seat portion 31a, that is, in the valve opening direction of the suction valve.

The anchor biasing spring 41 is disposed so as to apply a biasing force to the anchor 36 in a direction of a rod brim portion 35a, while maintaining a coaxial state by inserting one end into a center bearing portion 37b with a cylindrical diameter provided at a center of the rod guide 37. The moving amount 36e of the anchor 36 is set larger than the moving amount 30e of the suction valve 30. This is for the suction valve 30 to be surely closed.

Since the rod 35 and the rod guide 37 slide each other, and the rod 35 repeatedly collides with the suction valve 30, there is used a material obtained by applying heat treatment on a martensitic stainless steel in consideration of hardness and corrosion resistance. A magnetic stainless steel is used for the anchor 36 and the fixed core 39 in order to form a magnetic circuit, while an austenitic stainless steel is used for the rod biasing spring 40 and the anchor biasing spring 41 in consideration of corrosion resistance.

The anchor 36 is configured by a magnetic path forming unit that is formed on an outer peripheral side of the anchor and forms a magnetic path, and a guide portion that is formed on the inner peripheral side of the anchor 36, has a higher hardness than that of the magnetic path forming unit, and guides a sliding surface between with the rod 35. The magnetic path forming unit forms a magnetic path and affects magnetic attraction force characteristics, while the guide portion does not affect the magnetic path but forms a sliding portion between with the rod. Then, in this embodiment, the anchor 36 is subjected to a heat treatment or the like only on the guide portion to raise the hardness, so that the wear resistance of the sliding portion can be improved without deteriorating the magnetic characteristics.

When the anchor 36 and the rod 35 collide with the fixed core 39, the collision mass is reduced by a mass of the anchor 36 since the movement of the anchor 36 stops but the anchor 36 continues to move. This can reduce a collision load and collision sound.

Alternatively, the anchor 36 may be formed by forming the magnetic path forming unit and the guide portion of the anchor 36 from separate members respectively, and combining them. In this case, the magnetic path forming unit may be formed of a magnetic material having higher magnetic characteristics than the guide portion, and the guide portion may be formed of a hardened material or the like having higher hardness than the magnetic path forming unit.

By forming the magnetic path forming unit and the guide portion of the anchor 36 from separate members, and by using a magnetic material for the magnetic path forming unit and a high hardness material for the guide portion according to the respective functions, easiness of processing and heat treatment or surface treatment can be improved. Moreover, as a method of improving the hardness of the guide part, heat treatment such as quenching treatment or surface treatment such as plating treatment may be used.

Then, by converging portions having a function of contacting with other members, such as a contact portion with the rod 35, a spring receiving portion of the anchor biasing spring 41 to bias the anchor 36, and a stopper portion to restrict the movement of the anchor 36, on the guide portion having the higher hardness of the anchor 36, their abrasion resistance can also be improved simultaneously.

Further, by forming a through hole to hydraulically connect the front and rear of the anchor 36 on the guide portion of the anchor 36, it is possible to form a breathing hole to release an excluded volume necessary for the operation of the anchor 36 without reducing the cross sectional area of the magnetic path, and to prevent reduction of the magnetic attraction force. According to the above configuration, three springs are organically arranged and configured in the suction valve portion A and the solenoid mechanism portion B. The suction valve biasing spring 33 formed in the suction valve portion A, and the rod biasing spring 40 and the anchor biasing spring 41 formed in the solenoid mechanism portion B correspond to this. In this embodiment, all of the springs use a coil spring, but may have any configuration as long as being capable of providing a biasing force.

A relationship among these three spring forces is constructed by the following equation.

Rod biasing spring 40 force>anchor biasing spring 41 force+suction valve biasing spring 33 force+ force trying to close suction valve by fluid     (1)

According to the relationship of Equation (1), under a non-energized state, each spring force causes the rod 35 to act as a force f1 in a direction of separating the suction valve 30 from the suction valve seat portion 31a, that is, in a valve opening direction. From Equation (1), the force f1 in the valve opening direction is expressed by the following Equation (2).

$$f1 = \text{rod biasing spring force} - (\text{anchor biasing spring force} + \text{suction valve biasing spring force} + \text{force trying to close suction valve by fluid}) \quad (2)$$

Finally, a configuration of the coil portion C will be described. The coil portion C consists of a first yoke 42, the electromagnetic coil 43, a second yoke 44, a bobbin 45, a terminal 46, and a connector 47. The coil 43, in which a copper wire is wound a plurality of times on the bobbin 45, is arranged so as to be surrounded by the first yoke 42 and the second yoke 44, and is molded and fixed integrally with a connector, which is a resin member. Two ends each of the terminal 46 are respectively connected to both ends of the copper wire of the coil so as to be energizable. Similarly, the terminal 46 is molded integrally with the connector, and a remaining end is connectable to the engine control unit side.

In the coil portion C, a hole portion in a center portion of the first yoke 42 is press-fitted and fixed by the outer core 38. At that time, an inner diameter side of the second yoke 44 comes into contact with the fixed core 39 or is close to the fixed core 39 with a slight clearance.

Both of the first yoke 42 and the second yoke 44 are made of a magnetic stainless steel material in order to form a magnetic circuit and considering corrosion resistance. For the bobbin 45 and the connector 47, there is used a high-strength heat-resistant resin in consideration of strength characteristics and heat resistance characteristics. Copper is used for the coil 43, and a brass plated with metal is used for the terminal 46.

By configuring the solenoid mechanism portion B and the coil portion C as described above, a magnetic circuit is formed by the outer core 38, the first yoke 42, the second yoke 44, the fixed core 39, and the anchor 36, as shown by arrows in FIG. 4, and applying an electric current to the coil causes a magnetic attractive force between the fixed core 39 and the anchor 36, and causes a force that attracts each other. In the outer core 38, by making the fixed core 39 and the anchor 36 to be thin-walled as possible in an axial portion where mutual magnetic attraction force is generated, almost all of the magnetic flux passes between the fixed core 39 and the anchor 36, so that the magnetic attraction force can be efficiently obtained.

When exceeding the force f1 in the valve opening direction of Equation (2), the magnetic attractive force enables a movement in which the anchor 36 as a movable portion is attracted to the fixed core 39 together with the rod 35, and contact of the core 39 with the anchor 36 and a continuance of the contact.

According to the above configuration of the high-pressure fuel supply pump according to the present invention, an operation in each process of suction, return, and discharge during a pump operation is as follows. First, the suction process will be described. In the suction process, rotation of the cam 93 in FIG. 3 moves the plunger 2 in the direction of the cam 93 (the plunger 2 goes down). That is, a position of the plunger 2 moves from the top dead center to the bottom dead center. Describing with reference to FIG. 1 for example, a volume of the pressuring chamber 11 increases and the fuel pressure in the pressuring chamber 11 decreases during the suction process state. When the fuel pressure in the pressuring chamber 11 becomes lower than the pressure of the suction passage 10d in this process, the fuel passes through the suction valve in the opened state, and flows into the pressuring chamber 11 by passing through a communication hole 1b provided in the high-pressure fuel supply pump body 1, and through cylinder outer peripheral passages 6a and 6b.

Since a positional relationship of individual parts on the electromagnetic suction valve 300 side in the suction process is shown in FIG. 4, description will be made with reference to FIG. 4. In this state, the electromagnetic coil 43 is kept in the non-energized state, and no magnetic biasing force is acting. Therefore, the suction valve 30 is in a state of being pressed by the rod 35 with a biasing force of the rod biasing spring 40, and remains open.

Next, the return process will be described. In the return process, rotation of the cam 93 in FIG. 3 moves the plunger 2 in an upward direction. That is, a position of the plunger 2 starts to move from the bottom dead center to the top dead center. At this time, a volume of the pressuring chamber 11 decreases in accordance with a compression motion after suction in the plunger 2, but the pressure of the pressuring chamber will not rise since the fuel once sucked into the pressuring chamber 11 is returned to the suction passage 10d again through the suction valve 30 in the valve opened state. This process is referred to as return process.

In this state, when a control signal from the engine control unit 27 is applied to the electromagnetic suction valve 300, the return process shifts to the discharge process. When the control signal is applied to the electromagnetic suction valve 300, a magnetic attraction force is generated in the coil portion C, which acts on each part. Since a positional relationship of individual parts on the electromagnetic suction valve 300 side when the magnetic attraction force acts is shown in FIG. 5, description will be made with reference to FIG. 5. In this state, a magnetic circuit is formed by the outer core 38, the first yoke 42, the second yoke 44, the fixed core 39, and the anchor 36, and applying an electric current to the coil causes a magnetic attractive force between the fixed core 39 and the anchor 36, and causes a force that attracts each other. When the anchor 36 is sucked by the fixed core 39, which is the fixed portion, the anchor 36 and a locking mechanism of the rod brim portion 35a move the rod 35 in a direction away from the suction valve 30. At this time, the suction valve 30 is closed by a biasing force of the suction valve biasing spring 33 and a fluid force caused by the fuel flowing into the suction passage 10d. After the valve is closed, the fuel pressure in the pressuring chamber 11 rises along with an ascending motion of the plunger 2. When the pressure becomes equal to or higher than the pressure at the fuel discharge port 12, the fuel is discharged at a high pressure via the discharge valve mechanism 8, and supplied to the common rail 23. This process is referred to as discharge process.

That is, a compression process (rising process from a bottom dead center to a top dead center) of the plunger 2 consists of the return process and the discharge process. Then, controlling an energization timing to the coil 43 of the electromagnetic suction valve 300 enables control of an amount of the high-pressure fuel to be discharged. When the energization timing of the electromagnetic coil 43 is made earlier, a ratio of the return process during the compression process is small while a ratio of the discharge process is large. That is, the amount of fuel returned to the suction passage 10d is reduced, while the amount of fuel discharged at a high pressure is increased. Whereas, when the energization timing is delayed, the ratio of the return process during the compression process is large while the ratio of the discharge process is small. That is, the amount of fuel returned to the suction passage 10*d* is increased, while the amount of fuel discharged at a high pressure is reduced. The energization timing of the electromagnetic coil 43 is controlled by a command from the engine control unit 27.

Configuring as described above enables control of an amount of fuel discharged at a high pressure to an amount required by the internal combustion engine, by controlling the energization timing of the electromagnetic coil 43.

FIG. 6 shows a positional relationship of individual parts on the electromagnetic suction valve 300 side in the discharge process. This figure shows a view of a non-energized state in which energization to the electromagnetic coil 43 is released in a state where the suction valve is closed after the pressure in the pump chamber has sufficiently increased. In this state, the system is established in preparation for the next cycle process, to effectively cause generation and action of magnetic attraction force in the next step. This structure is characterized in such a system preparation.

Figure 7:
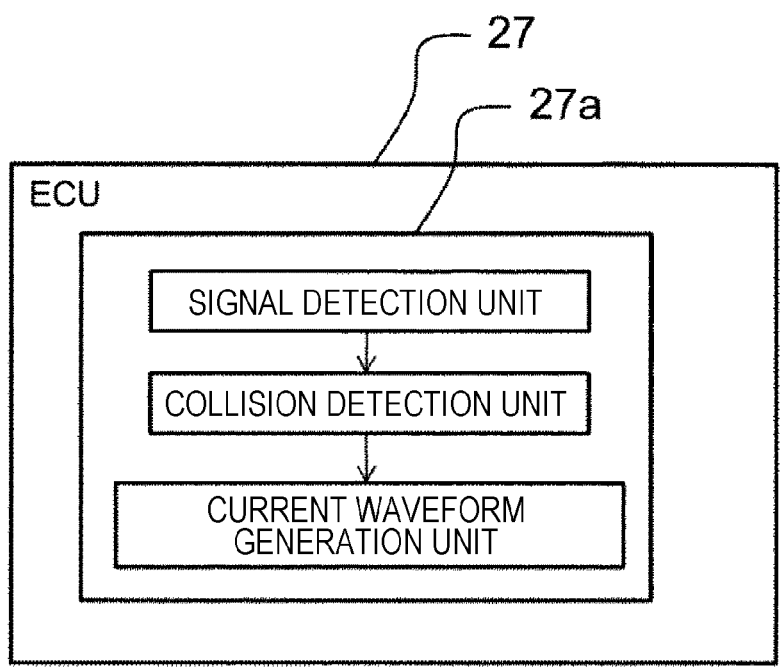
FIG. 7 is a diagram showing functional blocks of an engine control unit (ECU) 27 of the first embodiment according to the present invention.

FIG. 7 is a diagram showing functional blocks of the ECU 27 configured to control the high-pressure fuel supply pump of the first embodiment according to the present invention. The ECU 27 is provided with a CPU (control unit 27*a*) responsible for control. As shown in FIG. 7, the control unit 27*a* has functional blocks such as a signal detection unit, a collision detection unit, and a current waveform generation unit. The signal detection unit detects a signal of a physical quantity related to a driving voltage of the pump, such as a current flowing to the electromagnetic suction valve 300, a pressure pulsation of the common rail 23, and vibration of the pump body 1, by a current sensor, a pressure sensor, a vibration sensor, and the like. Next, the collision detection unit performs signal processing such as filtering and differential operation on the signal detected by the signal detection unit. By this signal processing, a collision timing between the anchor 36 and the fixed core 39 is detected. A specific method will be explained separately. Finally, the current waveform generation unit generates a current waveform in which a current value to the electromagnetic suction valve 300 is reduced before and after the collision timing, obtained by the collision detection unit, between the anchor 36 and the fixed core 39. Applying the current waveform obtained here to the electromagnetic suction valve 300 enables reduction of collision sound caused in the anchor 36 and the fixed core 39. That is, collision noise can be reduced by lowering the current value before the timing at which the anchor 36 collides with the fixed core 39.

It should be noted that this collision sound reduction control is particularly desirably performed in an idling state. As described above, the high-pressure fuel supply pump of the present embodiment includes: the fixed core 39 configured to suck the anchor 36 with an electromagnetic force; the suction valve 30 configured to be opened or closed when the anchor 36 is sucked by the fixed core 39; and the electromagnetic force generation unit (coil portion C) configured to generate the electromagnetic force when applied with a driving voltage. Then, in an operation state (idling state) where an engine is under no load and an engine rotation speed is equal to or lower than a set rotation speed, collision sound between the anchor 36 and the fixed core 39 may be a grating sound and cause a passenger to feel uncomfortable. Therefore, in the present embodiment, the control unit 27*a* of the ECU 27 controls a driving current so as to lower the driving current flowing to the electromagnetic coil 43 from a peak current before a timing at which the anchor 36 is sucked by the fixed core 39 and collides.

Figure 8:
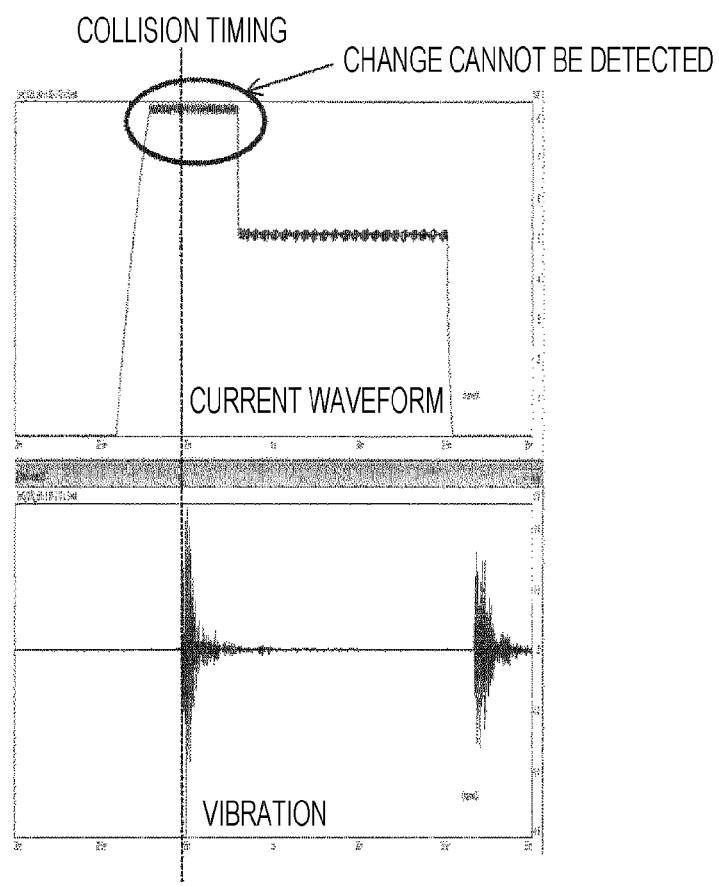
FIG. 8 is a current waveform detected by a signal detection means of the high-pressure fuel supply pump of the first embodiment according to the present invention.

FIG. 8 shows current waveforms detected by the signal detection unit of the control unit 27*a*. An upper part of the figure shows a current waveform of an actually measured driving current flowing to the electromagnetic coil 43, while a lower part shows actually measured vibration of the high-pressure fuel supply pump body 1. Since the vibration of the high-pressure fuel supply pump body 1 has occurred, it is considered that a position where a wave line is large in the lower part of FIG. 8 is a collision timing between the anchor 36 and the fixed core 39. Looking at the current waveform at that timing in the upper part of FIG. 8, since the current value fluctuates up and down, it is difficult to determine at which timing collision occurs from this waveform. That is, even if there is a change in the current value due to a collision, it is buried in the noise that fluctuates up and down, and the collision timing cannot be detected from the current waveform as it is. Therefore, in order to detect the collision timing, the process proceeds to the collision detection unit, which is the next step.

Figure 9:
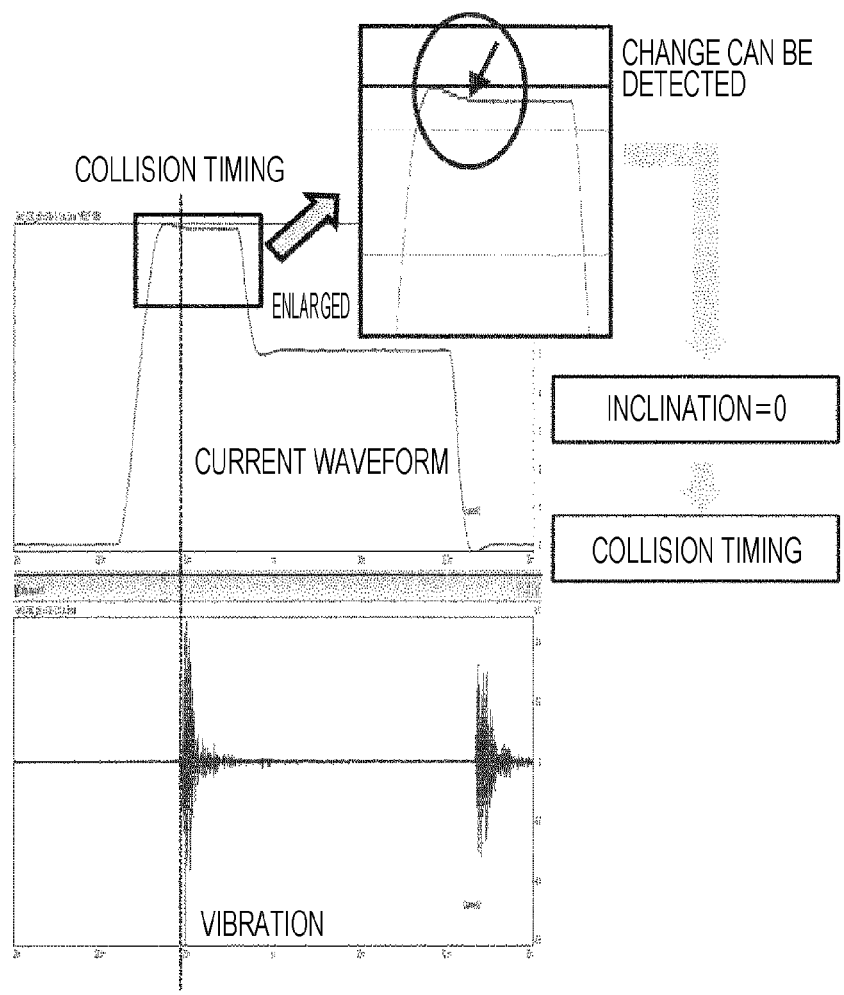
FIG. 9 is a specific example of a collision detection means of the high-pressure fuel supply pump of the first embodiment according to the present invention.

FIG. 9 is a specific example of the collision detection unit of the control unit 27*a*. An upper part of the figure shows a current waveform after performing signal processing on the measured current waveform of FIG. 8, and a lower part shows actually measured vibration of the high-pressure fuel supply pump body 1. Similarly to FIG. 8, it is considered that a position where a wave line is large is a collision timing between the anchor 36 and the fixed core 39. Here, looking at the current waveform after the signal processing in the upper part of FIG. 9, it can be seen that there is a change in the current waveform at a position of the dotted line, that is, the collision timing. This figure shows an enlarged view of this part. Looking at the enlarged view, it can be seen that the current value rises simultaneously with energization, once overshoots and then falls, and remains at a certain fixed value. That is, the control unit 27*a* estimates a timing at which the anchor 36 is sucked by the fixed core 39 and collides, by differentiating a driving current flowing by a driving voltage once. When the anchor 36 moves, the current changes since the inductance of the electromagnetic coil 43 changes. That is, when the current is changing, the anchor 36 is considered to be moving. On the other hand, when the anchor 36 collides with the fixed core 39 and stops the movement, it is considered that the current does not change since the inductance becomes constant. That is, when the current is constant, the anchor 36 is stopped. From these facts, a timing at which the current value decreases to a certain value, that is, a timing at which an inclination becomes zero is considered to be the timing at which the anchor 36 collides with the fixed core 39. Therefore, it is considered that the collision timing can be detected by focusing on an inclination of the current waveform subjected to the signal processing. For example, detecting the inclination of the current waveform, that is, a time timing at which the differential value becomes zero from a negative value is considered to be able to detect the collision timing.

Figure 10:
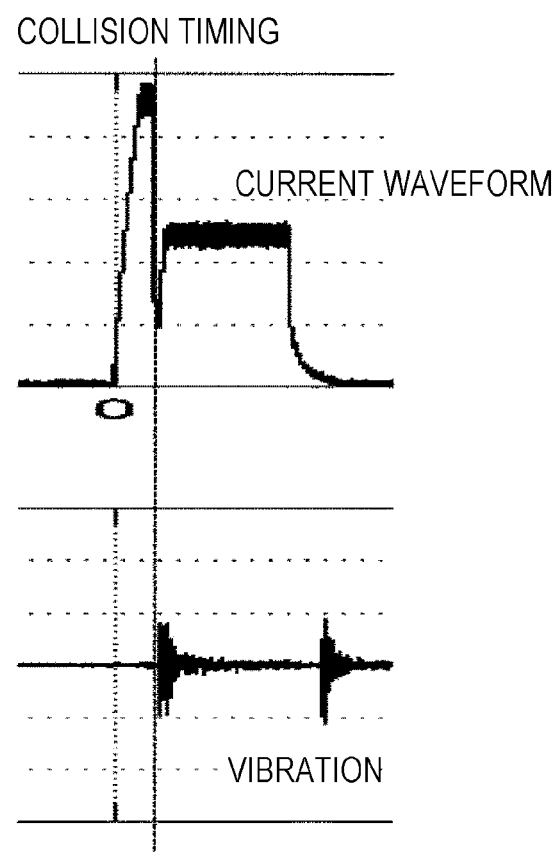
FIG. 10 is a current waveform obtained by a current waveform generation means of the high-pressure fuel supply pump of the first embodiment according to the present invention.

FIG. 10 shows a current waveform obtained by the current waveform generation unit of the control unit 27*a*. An upper part of the figure shows an actually measured value of the current waveform obtained by the current waveform generation unit, while a lower part shows actually measured vibration of the high-pressure fuel supply pump body 1. As shown in the figure, the waveform is such that a current value is reduced at a timing when the anchor 36 and the fixed core 39 collide with each other. This can reduce vibration of the high-pressure fuel supply pump body 1, and also reduce noise caused by the vibration.

As described above, the control unit 27a of the ECU in this embodiment determines a timing at which the anchor 36 is sucked by the fixed core 39 and collides from a physical quantity related to a driving voltage applied to the electromagnetic coil 43 (e.g., a driving current flowing to the electromagnetic coil 43), and performs control to lower a driving current flowing to the electromagnetic coil 43 from a peak current before this timing.

The control unit 27a estimates a timing at which the anchor 36 is sucked by the fixed core 39 and collides from a driving current flowing by a driving voltage applied to the electromagnetic coil 43 by the collision detection unit, and performs control to lower a driving current from a peak current before the timing estimated by the current waveform generation unit.

Figure 11:
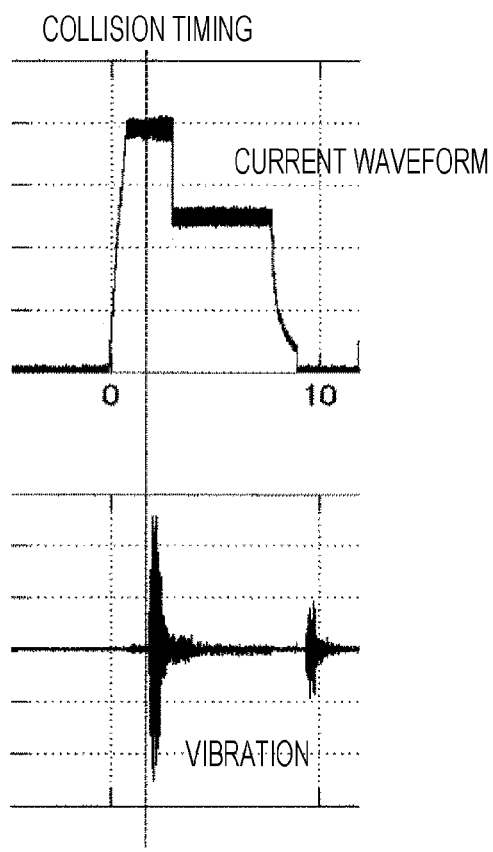
FIG. 11 is a conventional current waveform.

FIG. 11 shows current waveforms when a current control is not performed by the control unit 27a of the ECU 27 described above. An upper part of the figure shows an actually measured value of the current waveform, while a lower part shows actually measured vibration of the high-pressure fuel supply pump body 1. As shown in the figure, it can be seen that vibration of the high-pressure fuel supply pump body 1 at a timing when the anchor 36 and the fixed core 39 collide is larger than that in FIG. 10. That is, this shows that noise caused by the collision between the anchor 36 and the fixed core 39 can be reduced by the current control of the control unit 27a of the ECU 27 of the present embodiment.

Figure 12:
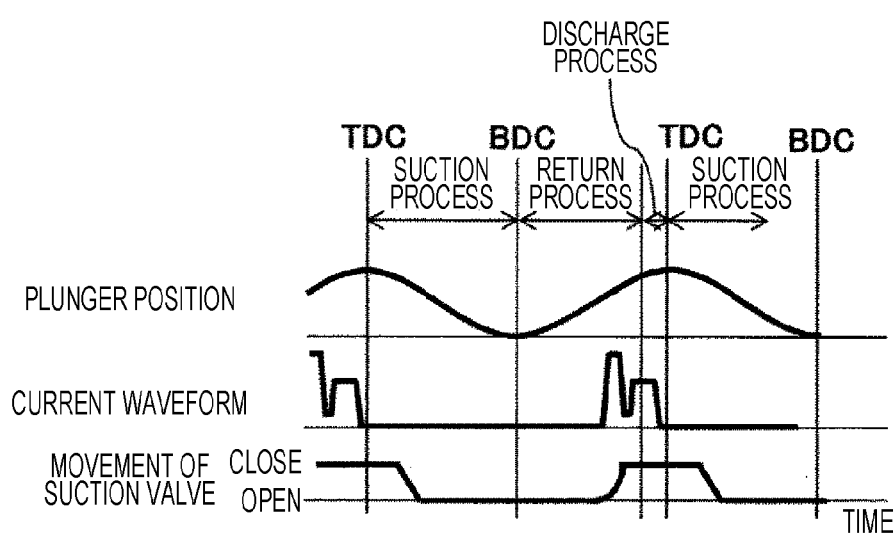
FIG. 12 is a timing chart of the high-pressure fuel supply pump of the first embodiment according to the present invention.

FIG. 12 shows a timing chart of the current control by the control unit 27a of the ECU 27. The timing chart in the figure shows from up a position of the plunger 2, a current waveform of a driving current flowing to the electromagnetic coil 43, and a movement of the suction valve 30. The horizontal axis shows one cycle period by time, returning from the suction process to the suction process, through the return process and the discharge process. A relationship between the movement of the suction valve 30 and the current waveform can be understood from the figure. As shown in the figure, when the electromagnetic coil 43 of the suction valve 30 is energized, the suction valve 30 starts to be closed. When an electric current is applied to the electromagnetic coil 43, a magnetic attractive force acts between the anchor 36 and the fixed core 39. It is necessary for the driving current to be supplied with a current of a magnitude necessary to overcome the force f1 in the opening direction of the suction valve 30.

At a time when this magnetic attractive force overcomes the force f1 in the opening direction of the suction valve 30, the anchor 36 starts moving toward the fixed core 39. As the anchor 36 moves, the rod 35 that is in contact with the flange portion 35a in an axial direction also moves, and the suction valve 30 completes the valve closing by a decrease in a static pressure due to a force of the suction valve biasing spring 33 and a fluid force, and mainly due to a flow rate through the seat portion from the pressuring chamber side. At this time, the anchor 36 collides with the fixed core 39 to generate noise. As described above, in the present embodiment, the control unit 27a of the ECU 27 detects a physical quantity related to a driving voltage such as a current of the electromagnetic coil 43, detects a collision timing between the anchor 36 and the fixed core 39, reduces the current value at that timing, and reduces noise due to the collision.

In the present embodiment, current control is performed to lower a current value at a collision timing between the anchor 36 and the fixed core 39. In other words, the current is controlled such that the anchor 36 collides with the fixed core 39 at a timing when the current value is low. Therefore, instead of the current, it is also possible to set a spring force of a spring that biases the fixed core 39 and a spring that biases an engaging member that engages with the fixed core 39, to an appropriate value such that the anchor 36 collides with the fixed core 39 in a state where the current value is lowered. That is, in the high-pressure fuel supply pump of the present embodiment, in an operation state where an engine is under no load and an engine rotation speed is equal to or less than a set rotation speed, a spring force of the anchor biasing spring 41 that biases the anchor 36 or a spring force of the rod biasing spring 40 that biases the engaging member that engages with the anchor is set such that the anchor 36 is sucked by the fixed core 39 and collides after a driving current is lowered from the peak current.

Second Embodiment

Figure 13:
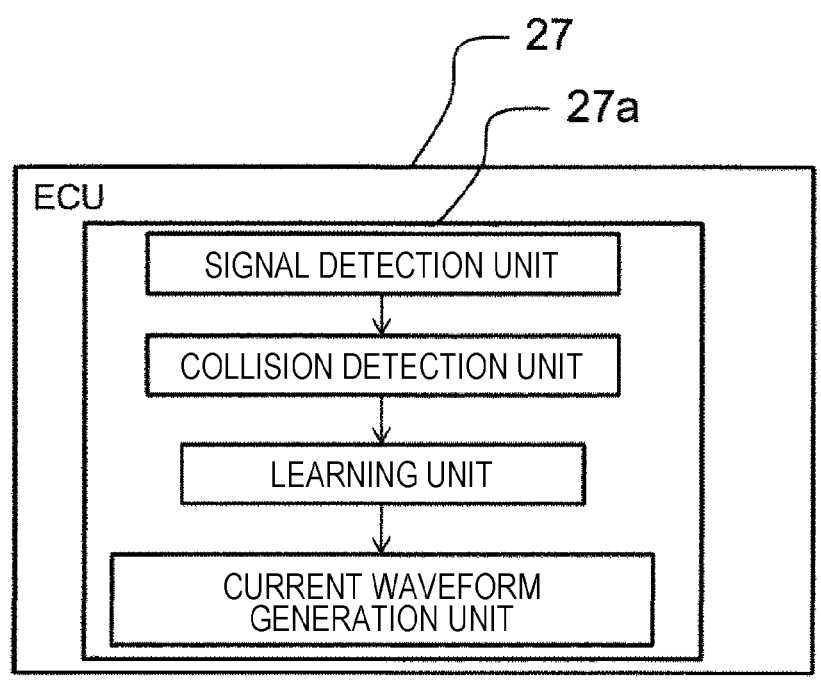
FIG. 13 is a diagram showing functional blocks of an ECU 27 according to a second embodiment of the present invention.

FIG. 13 is a diagram showing functional blocks of an ECU 27 configured to control a high-pressure fuel supply pump of a second embodiment according to the present invention. Descriptions of the same contents as those in the first embodiment will be omitted. As shown in FIG. 13, a control unit 27a of the ECU 27 has functional blocks such as a signal detection unit, a collision detection unit, a learning unit, and a current waveform generation unit. The signal detection unit detects a signal of a physical quantity related to a driving voltage of a pump, such as a current of an electromagnetic coil 43. The collision detection unit detects a collision timing between an anchor 36 and a fixed core 39, by performing signal processing on the signal detected by the signal detection unit. The learning unit learns the collision timing detected by the collision detection unit. The current waveform generation unit generates a current waveform in which a current value is reduced at a collision timing between the anchor 36 and the fixed core 39 based on the collision timing learned by the learning unit. Applying the current waveform obtained here to the electromagnetic suction valve 300 enables reduction of collision sound caused in the anchor 36 and the fixed core 39.

As described above, in the present embodiment, the control unit 27a of the ECU 27 learns a timing at which the anchor 36 is sucked by the fixed core 39 and collides, from a physical quantity related to a driving voltage (e.g., a driving current flowing to the electromagnetic coil 43) in a learning mode by the learning unit. Then, the control unit 27a performs control to lower a driving current flowing to the electromagnetic coil 43 from a peak current before the timing learned in the learning mode in an operation mode.

Specifically, in the learning mode, the above-mentioned physical quantity is a driving current flowing by a driving voltage applied to the electromagnetic coil 43, and the control unit 27a learns a timing at which the anchor 36 is sucked by the fixed core 39 and collides from the driving current by the learning unit and the collision detection unit. Then, control is performed to lower a driving current from a peak current before the timing learned in the learning mode in the operation mode by the current waveform generation unit. Moreover, the control unit 27a learns a timing at which the anchor 36 is sucked by the fixed core 39 and collides, by performing signal processing on a driving current flowing by a driving voltage in the learning mode. Specifically, similarly to the first embodiment, the above-mentioned collision timing is learned by differentiating a driving current once. Then, the control unit 27a learns, as the timing at which the anchor 36 is sucked by the fixed core 39 and collides, a timing at which an inclination of a waveform outputted by differentiating a driving current once in the learning mode becomes substantially 0.

REFERENCE SIGNS LIST

1 pump body
2 plunger
6 cylinder
7 seal holder
8 discharge valve mechanism
9 pressure pulsation reduction mechanism
10*a* low-pressure fuel inlet
11 pressuring chamber
12 fuel discharge port
13 plunger seal
23 common rail
30 suction valve
31 suction valve seat
32 suction valve stopper
33 suction valve spring
35 rod
36 anchor
38 outer core
39 fixed core
40 rod biasing spring
41 anchor biasing spring
43 electromagnetic coil
300 electromagnetic suction valve
361 magnetic path forming unit
362 guide part

The invention claimed is:

1. A control device for controlling a high-pressure fuel supply pump comprising: an anchor; a fixed core configured to attract the anchor with an electromagnetic force; a suction valve configured to be opened or closed when the anchor is sucked by the fixed core; and an electromagnetic force generator configured to generate the electromagnetic force when applied with a driving voltage, wherein
the control device comprises a controller configured to perform control to lower a driving current from a peak current before a timing, the timing being a timing at which the anchor is sucked by the fixed core and collides in an operation state, the operation state being a state where an engine is under no load and an engine rotation speed is equal to or less than a set rotation speed,
wherein the controller is configured to estimate a timing at which the anchor is sucked by the fixed core and collides from a driving current flowing by the driving voltage; and to perform control to lower a driving current from a peak current before an estimated timing.

2. A control device for controlling a high-pressure fuel supply pump comprising: an anchor; a fixed core configured to attract the anchor with an electromagnetic force; a suction valve configured to be opened or closed when the anchor is sucked by the fixed core; and an electromagnetic force generator configured to generate the electromagnetic force when applied with a driving voltage, wherein
the control device comprises a controller configured to perform control to lower a driving current from a peak current before a timing, the timing being a timing at which the anchor is sucked by the fixed core and collides in an operation state, the operation state being a state where an engine is under no load and an engine rotation speed is equal to or less than a set rotation speed,
wherein the controller is configured to estimate a timing at which the anchor is sucked by the fixed core and collides, by performing signal processing on a driving current flowing by the driving voltage, and to perform control to lower a driving current from a peak current before an estimated timing.

3. A control device for controlling a high-pressure fuel supply pump comprising: an anchor; a fixed core configured to attract the anchor with an electromagnetic force; a suction valve configured to be opened or closed when the anchor is sucked by the fixed core; and an electromagnetic force generator configured to generate the electromagnetic force when applied with a driving voltage, wherein
the control device comprises a controller configured to perform control to lower a driving current from a peak current before a timing, the timing being a timing at which the anchor is sucked by the fixed core and collides in an operation state, the operation state being a state where an engine is under no load and an engine rotation speed is equal to or less than a set rotation speed,
wherein the controller is configured to estimate a timing at which the anchor is sucked by the fixed core and collides by differentiating the driving current flowing by the driving voltage once, and to perform control to lower a driving current from a peak current before an estimated timing.

4. The control device for the high-pressure fuel supply pump according to claim 3, wherein
the controller is configured to estimate a timing at which an inclination of a waveform outputted by differentiating the driving current once becomes substantially 0, as a timing at which the anchor is sucked by the fixed core and collides, and to perform control to lower a driving current from a peak current before an estimated timing.

* * * * *